US006673157B1

(12) United States Patent
McKim et al.

(10) Patent No.: US 6,673,157 B1
(45) Date of Patent: Jan. 6, 2004

(54) METHODS FOR STRIPPING PAINT WITH DMSO CONTAINING COMPOSITIONS

(75) Inventors: Artie S. McKim, Slidell, LA (US); George Kvakovszky, Slidell, LA (US); James E. Schmidheiser, West Chester, PA (US)

(73) Assignee: Gaylord Chemical Corporation, Slidell, LA (US)

(*) Notice: Subject to any disclaimer, the term of this patent is extended or adjusted under 35 U.S.C. 154(b) by 0 days.

(21) Appl. No.: 09/512,162

(22) Filed: Feb. 24, 2000

(51) Int. Cl.[7] ........ B08B 3/04

(52) U.S. Cl. ........ 134/2; 134/2; 134/38; 134/42; 134/22.19; 510/201

(58) Field of Search ........ 134/38, 2, 22.19, 134/42; 510/201

(56) References Cited

U.S. PATENT DOCUMENTS

| | | | | | |
|---|---|---|---|---|---|
| 2,694,658 | A | | 11/1954 | Crepeau et al. | 134/26 |
| 2,940,877 | A | * | 6/1960 | Jaffee et al. | 134/38 |
| 3,600,322 | A | | 8/1971 | Morison | 252/171 |
| 5,011,621 | A | | 4/1991 | Sullivan | 252/162 |
| 5,015,410 | A | | 5/1991 | Sullivan | 252/166 |
| 5,346,640 | A | | 9/1994 | Leys | 252/162 |
| 5,753,603 | A | | 5/1998 | Lallier et al. | 510/211 |
| 5,929,005 | A | | 7/1999 | Smith | 510/174 |
| 5,994,282 | A | * | 11/1999 | Lallier | 510/203 |
| 6,040,284 | A | * | 3/2000 | Marquis et al. | 510/201 |
| 6,057,276 | A | * | 5/2000 | Smith | 510/174 |
| 6,096,699 | A | * | 8/2000 | Bergemann et al. | 134/38 |
| 6,130,192 | A | * | 10/2000 | Vitomir | 510/202 |
| 6,159,915 | A | * | 12/2000 | Machac, Jr. et al. | 510/201 |
| 6,169,061 | B1 | * | 1/2001 | Machac, Jr. et al. | 510/201 |

FOREIGN PATENT DOCUMENTS

| | | | |
|---|---|---|---|
| CH | 670 832 A5 | | 7/1989 |
| DE | 004136811 A1 | * | 5/1993 |
| WO | WO 86/03766 | | 7/1986 |
| WO | WO 88/06640 | | 9/1988 |

OTHER PUBLICATIONS

Sulzbergers et al., "Some Effects of DMSO on Human Skin in Vivo," Annals New York Academy of Sciences pp. 437–450 (1966).

Ursin, et al., "Permeability of Commercial Solvents Through Living Human Skin," AIHA Journal, 56:651–660 (1995).

Woodford, et al., "Penetration Enhancers and the Percutaneous Absorption of Drugs: An Update," J. Toxicol.–Cut. & Ocular Toxicol., 5(3):167–177 (1986).

ICH Harmonized Tripartite Guidelines Recommended for Adoption on Jul. 17, 1997.

* cited by examiner

*Primary Examiner*—Frankie L. Stinson
(74) *Attorney, Agent, or Firm*—Needle & Rosenberg, P.C.

(57) ABSTRACT

The invention relates to a method for stripping paint from surfaces, comprising:

a) contacting a painted surface with a paint stripping composition, and b) separating at least some of the paint contacted with the paint stripping composition from the painted surface;

c) wherein the paint stripping composition comprises:

i) from about 60 to about 99% by volume of one or more environmentally acceptable esters selected from the group consisting of t-butyl acetate, a carboxylic acid methyl ester having a caboxylate residue of at least three carbon atoms, an ester of lactic acid, an ester of oxalic acid having two alkoxy residues wherein each alkoxy residue has at least three carbon atoms, diethyl tartrate, triethyl citrate, tributyl citrate, and one or more sugar esters; and ii) dimethyl sulfoxide which is present in an amount from about 1 to about 40% by volume of the composition.

23 Claims, No Drawings

METHODS FOR STRIPPING PAINT WITH DMSO CONTAINING COMPOSITIONS

FIELD OF THE INVENTION

This invention relates generally to compositions effective for removing paints from surfaces and, in particular, environmentally friendly, non-chlorinated paint stripper compositions comprising dimethyl sulfoxide and an environmentally acceptable ester.

BACKGROUND OF THE INVENTION

Paints typically comprise liquid or semisolid mixtures of (a) film-forming components such as a natural or synthetic resins, polymers, or drying oils, (b) a solvent or thinner, and (c) optional pigments and/or other additives. A wide variety of paints which vary widely in their resins, polymers, solvents, pigments, an d additives have been developed and/or specialized for applications involving a wide variety of surface s and intended purposes. The most common purposes are to protect the surface from corrosion, oxidation, or other types of weathering or deterioration; and/or to provide a decorative effect. The paint is typically applied to a surface to form a thin film disposed on the surface. The resulting "paint film," will hereinafter, for the purposes of this disclosure, be referred to as "paint".

The paint often undergoes deterioration over time, or becomes otherwise undesirable, so that a need arises to remove the old paint from the surface, without substantially damaging the surface. Various approaches for removing paint and/or graffiti from a surface were discussed in U.S. Pat. No. 5,346,640. Use of chemical compositions suitable for removing paint, i.e. "paint strippers" are well known in the art. For example, U.S. Pat. No. 3,600,322 describes the use of mixtures of methylene chloride and methanol solvents for stripping paint, varnish or lacquers. While methylene chloride and methanol are effective in stripping paint, both solvents are toxic and volatile, and represent significant toxicological and environmental hazards. Paint stripping compositions containing lactams or lactones, particularly N-methyl-2-pyrrolidone or gamma-butyrolactone, in admixture with other active compounds, for example alkylene glycol ethers, are also known in the art. Compare in this respect WO 86/03,766 and WO 88/06,640 and U.S. Pat. Nos. 5,011,121 and 5,015,410.

U.S. Pat. No. 5,346,640 describes compositions for removing paint or graffiti from surfaces, comprising seven ingredients, including N-methylpyrrolidone, propylene carbonate, isocetyl alcohol, and dimethyl sulfoxide ("DMSO"). U.S. Pat. No. 5,753,603 describes the use of mixtures of dipolar aprotic solvents which include N-methylpyrrolidone, gamma-butyrolactone, dimethylformamide, and DMSO, in combination with aromatic and aliphatic methyl ethers for paint stripping applications. Swiss Patent No. CH 670,832 describes the use of paint stripping compositions comprising several ingredients, including (a) resin solubilizers selected esters including methyl acetate, ethyl acetate, isopropyl acetate, butyl acetate, diethyl carbonate, ethylene carbonate, diethyl tartrate, triethyl citrate, and gamma-butyrolactone, (b) swelling agents comprising ethylene or propylene glycol and certain ether and/or ester derivatives thereof, (c) polar solvents including dimethylformarnide and DMSO.

Unfortunately, most prior art paint strippers have employed volatile organic compounds or solvents and/or other ingredients that have undesirable degrees of toxicity, and/or potential for environmental damage, such as general air or water pollution. All of the above described compositions include at least one component which presents a disadvantage in the area of health and safety of end-users and manufacturing personnel, or to the environment. Methylene chloride is a known animal carcinogen and a suspect human carcinogen, and many similar chlorinated solvents are similarly suspect. N-methyl-2-pyrrolidone is fetotoxic, and dimethyl formamide is a liver toxin. Gamma-butyrolactone is mutagenic and is a reproductive and developmental toxin and has significant adverse effect on the human central nervous system. Moreover, spills of most of the solvents described in the prior art are listed by the Environmental Protection Agency (EPA) under the code of federal regulations (40 CFR) and the provisions of section 313 of Title III of the Superfund Amendments and Reauthorization Act (SARA) as "hazardous waste". Spills of these materials endanger the environment and require expensive remediation efforts to correct. Some states, such as California, are enacting even stricter environmental and/or labeling requirements for materials containing potentially hazardous components that are sold to consumers, such as the above-described paint stripping compositions.

In light of the increasingly stringent environmental and safety regulations which have been and will likely continue to be enacted, a serious need exists for paint stripping formulations that are significantly more toxicologically and environmentally acceptable.

SUMMARY OF THE INVENTION

The composition according to the present invention is capable of providing the effective stripping of paint from surfaces while employing components that have very low levels of toxicity, a low cost, and are environmentally acceptable.

In one aspect, the invention relates to a paint stripping composition comprising:

a) one or more environmentally acceptable esters, and b) dimethyl sulfoxide, which is present in an amount not greater than about 70% by volume of the composition.

In another aspect, the invention relates to a method for stripping paint from surfaces, comprising:

a) contacting a painted surface with a paint stripping composition, and b) separating at least some of the paint contacted with the paint stripping composition from the painted surface; wherein the paint stripping composition comprises:

i) one or more environmentally acceptable esters, and ii) dimethyl sulfoxide which is present in an amount not greater than about 70% by volume of the composition.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE PREFERRED EMBODIMENTS

The present invention may be understood more readily by reference to the following detailed description of certain preferred embodiments and examples included therein.

Before the present compounds, compositions, articles, devices and/or methods are disclosed and described, it is to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims that follow, reference will be made to a number of terms that shall be defined to have the following meanings:

"Optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl groups and lower alkyl groups where there is substitution.

References in the specification and concluding claims to parts by weight of a particular element or component in a composition or article denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more $—OCH_2CH_2O—$ units in the polyester, regardless of whether ethylene glycol was used to prepare the polyester. Similarly, a sebacic acid residue in a polyester refers to one or more $—CO(CH_2)_8CO—$ moieties in the polyester, regardless of whether the residue is obtained by reacting sebacic acid or an ester thereof to obtain the polyester.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain from 1 to 12 carbon atoms. The term "lower alkyl" intends an alkyl group of from one to six carbon atoms, preferably from one to four carbon atoms. The term "cycloalkyl" intends a cyclic alkyl group of from three to eight, preferably five or six carbon atoms.

The term "alkylene" as used herein refers to a difunctional saturated branched or unbranched hydrocarbon chain containing from 1 to 24 carbon atoms, and includes, for example, methylene ($—CH_2—$), ethylene ($—CH_2—CH_2—$), propylene ($—CH_2—CH_2—CH_2—$), 2-methylpropylene [$—CH_2—CH(CH_3)—CH_2—$], hexylene [$—(CH_2)_6—$] and the like. "Lower alkylene" refers to an alkylene group of from 1 to 6,more preferably from 1 to 4, carbon atoms. The term "cycloalkylene" as used herein refers to a cyclic alkylene group, typically a 5- or 6-membered ring.

The term "aliphatic" as used herein describes branched or unbranched hydrocarbon chains or groups containing 1 to 24 carbon atoms, which are saturated, i.e., they have no double bonds between the carbon atoms.

The term "aromatic" as used herein describes substituted or unsubstituted benzene-like compounds of six to twenty five carbon atoms having at least one 6-membered ring residue of carbon atoms, with alternating (conjugated) double bonds which have 4n +2 Π electrons, wherein n is a positive integer.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it may not be possible to specify an exact "effective amount." However, an appropriate effective amount may be determined by one of ordinary skill in the art using only routine experimentation.

One aspect of the invention relates to low cost yet environmentally friendly compositions, which may be utilized in processes for stripping paint from surfaces. In particular, the compositions of the invention have been specifically formulated so as to principally comprise components which have very low levels of toxicity and are environmentally acceptable, yet remain effective for stripping paint from surfaces.

In one aspect, the invention provides paint stripping compositions including:

a) one or more environmentally acceptable esters, and b) dimethyl sulfoxide.

The one or more environmentally acceptable esters employed in the compositions and processes of the invention comprise one or more ester functional groups of the formula

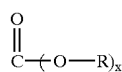

The R groups or residues of the ester functional groups are carbon containing groups having a carbon atom bound to an oxygen atom of the carbonate group. The R residues do not comprise halides or metals, but otherwise may comprise alkyl, alkene, alkylene, aromatic, or heteroaromatic residues, which may be straight chained, cyclic, branched, substituted or unsubstituted. Preferably, the R residues comprise alkyl residues. In many embodiments, the esters of the invention preferably comprise one or more carboxylic acid esters, wherein x=1. In other embodiments, the esters of the invention comprise carbonate esters, wherein x=2.

In many embodiments, the environmentally acceptable esters comprise carboxylic acid esters having the formula $R_a$—$CO_2$—$R_6$. Carboxylic esters are often but not necessarily derived from condensation of the corresponding carboxylic acids and alcohols. Carboxylic acid esters have a carboxylate residue comprising the $R_a$—(CO)—O— portion of the ester, and an alkoxy residue comprising the —O—$R_b$ portion of the carboxylic acid ester.

The $R_a$residues may comprise hydrogen (i.e. formates), or a hydrocarbyl residue having from about one to about twenty-four carbon atoms. The $R_a$ residues do not comprise halides or metallic substituents, but otherwise may comprise alkyl, alkene, alkylene, aromatic, heteroaromatic, or heteroatomic residues, which may be straight chained or branched, open chained or cyclic, substituted, or unsubstituted. Preferably, the $R_a$ residues comprise alkyl residues. In certain preferred embodiments, the $R_a$ residues comprise lower alkyl residues, or alkyl residues having more than three carbon atoms. In certain highly preferred embodiments, the $R_a$ residue comprises methyl, corresponding to an acetate residue.

Aromatic $R_a$ residues include but are not limited to phenyl, tolyl, xylyl, napthyl, terephthayl, isophthalyl, and similar residues. The $R_a$ residues may comprise one or more additional heteroatoms or functional groups, to form multifunctional residues, including additional carboxylate residues. In some preferred embodiments, the $R_a$ residue may have one or more oxygen or nitrogen substituents or substituent groups, as exemplified by lactate residues. Preferably the carboxylate residues do not comprise tartrate or citrate residues. In preferred embodiments, the carboxylate residues do not comprise short chain aliphatic diacid residues derived from succinic, adipic, or glutaric acids, or lower alkyl diesters of short chain aliphatic diesters.

The alkoxy residues of the carboxylic esters have $R_b$ groups comprising from about one to about twenty-four carbon atoms. The alkoxy residues do not comprise halides or metals, but otherwise may comprise alkyl, alkene, alkylene, aromatic, or heteroaromatic residues, which may be branched, unbranched, substituted or unsubstituted. Preferably, the $R_b$ residues comprise alkyl residues, and even more preferably, the $R_b$ residues comprise lower alkyl residues. In certain preferred embodiments, the alkoxy residues comprise methyl or ethyl residues.

The alkoxy residues of the carboxylic esters may comprise alkylene glycol or alkylene polyol residues. Examples of alkylene glycol or alkylene polyol residues include ethylene glycol, diethylene glycol, triethylene glycol, polyethylene glycol, propylene glycol, dipropylene glycol, polypropylene glycol, glycerol, trimethylol propane, and other similar residues. The alkoxy residues may also comprise alkyl or lower ether residues of the alkylene glycol or alkylene polyols. Examples include but are not limited to 2-butoxyethanol acetate, 2-ethoxyethanol acetate, ethylene glycol monomethyl ether acetate, diethylene glycol monobutyl ether acetate, diethylene glycol monoethyl ether acetate, diethylene glycol monomethyl ether acetate, or 2-methoxy-1-methylethyl acetate. In certain preferred embodiments, the esters of the invention do not comprise di(lower)alkyl ether/esters of di(lower)alkylidene glycols such as diethylene glycol monoethyl ether acetate, dipropylene glycol monomethyl ether acetate, mono-lower alkyl esters of ethylene glycol and propylene glycol, such as ethylene or propylene glycol monoacetate, or monobutyrate.

In some preferred embodiments, the one or more esters employed in the compositions and processes of the invention may also comprise carbonate esters, which have two alkoxy groups attached to an ester functional group, that is, where x=2 in the formula described hereinabove. It is to be understood that in carbonate esters, the two R groups may be independently selected, and may be the same or different. The R residues preferably comprise from about one to about twenty-four carbon atoms. The R residues preferably do not comprise halides or metals, but otherwise may comprise alkyl, alkene, alkylene, aromatic, or heteroaromatic residues, which may be branched, unbranched, substituted or unsubstituted. Preferably, the R residues comprise alkyl residues. Examples of suitable carbonate esters include dimethyl carbonate, diethyl carbonate, methyl-ethyl carbonate, propylene carbonate, and diphenyl carbonate. In certain preferred embodiments, the esters of the invention do not comprise dimethyl carbonate, diethyl carbonate, ethylene carbonate, diphenyl carbonate or propylene carbonate.

Preferably, the esters of the invention are substantially liquid at normal ambient temperatures between about 0° C. and about 40° C. Preferably, the esters have relatively high boiling points and low volatility, so that evaporation of the esters is relatively slow, so that the paint may be well penetrated before the paint stripping composition evaporates from the surface. Preferred esters have boiling points above about 20° C. Preferably, the esters have a flash point greater than about 32° F., to minimize the danger of ignition of vapors of the esters during their application. More preferably, the esters have a flash point greater than about 75° F.

For the purposes of this disclosure, "environmentally acceptable" esters are esters having an oral, dermal, or inhalation toxicity similar to those of "Class 3" esters with low toxic potential, as defined by the International Conference of Harmonization (ICH) under the provisions of the ICH Harmonized Tripartite Guideline recommended for adoption on Jul. 17, 1997. Esters not ranked in Class 3 by ICH, but having similarly favorable toxicity, as measured by similar oral, dermal or inhalation toxicity (LD50, LC50, etc), have "environmental acceptability" under this definition. Preferably, the environmentally acceptable esters of the invention have an $LD_{50}$ toxicity in rats of at least 1900 milligrams per kilogram. Even more preferably, the environmentally acceptable esters have an $LD_{50}$ toxicity in rats of at least 3000 milligrams per kilogram. Accordingly, the esters of the invention preferably do not comprise certain esters of relatively high toxicity. The esters of the invention preferably do not comprise methyl formate, ethylene carbonate, gamma-butyrolactone, diethyl oxalate, or dibutyl phthalate.

Preferably, the environmentally acceptable esters comprise greater than about 60% of the paint stripping composition by volume, in order to promote the toxicological and environmental acceptability of the compositions. More preferably, the composition comprises from about 61 to about 99% of the one or more environmentally acceptable esters by volume. Even more preferably, the compositions comprise from about 70 to about 95,or from about 75 to about 90% of the composition by volume.

The paint stripping compositions of the invention also includes dimethyl sulfoxide. DMSO is a readily available and relatively inexpensive industrial solvent with relatively low volatility. DMSO is a very strong and polar aprotic solvent, which can readily dissolve relatively large quantities of other materials, especially compounds or salts of intermediate or high polarity. Blends of DMSO and relatively non-polar solvents such as the esters of the invention are therefore capable of penetrating, softening, and/or dissolving a wide variety of components which may be present in paint films, so as to provide high effectiveness for stripping paint.

DMSO is a relatively non-toxic material, having an LD50 oral (rat) toxicity of approximately 17,400 milligrams per kilogram. Pure DMSO can rapidly penetrate animal skin (at a rate of approximately 176±42 $g/m^2/hr$, as compared to approximately 14.8±0.1 $g/m^2/hr$ for water), but because DMSO is relatively non-toxic, skin penetration of DMSO is not hazardous. M. B. Sulzberger et.al. have suggested, in "Some Effects of DMSO on Human Skin in Vivo," Annals of the New York Academy of Sciences, 437–450, 1966,that DMSO "when applied to the intact skin in sufficient concentration (usually 70% and above), penetrates to the blood vessels in many individuals. In many individuals, there is an abrupt fall-off in its capacity to penetrate in concentrations below 70%."

At high concentrations, DMSO can enhance the penetration of other substances through the skin, possibly including potentially hazardous pigment or polymer paint components, but the ability of DMSO to speed skin penetration of other substances quickly declines at lower DMSO concentrations. R. Woodford and B. W. Barry suggest (in J. Toxicol. Cut. & Occular Toxicol. 5(3) 167–177, 1986) that DMSO concentrations in excess of 60% are necessary for DMSO to enhance the rate of skin penetration of other materials. Recently, C. Ursin et.al. have found (in "Permeability of Commercial Solvents Through Living Human Skin", *J. Am. Ind. Hyg. Assoc.*, 56: 651–660, 1995) that DMSO did not increase the rate of skin penetration of octyl acetate at DMSO concentrations as high as 40%. In the context of the present invention, the DMSO concentration is preferably less than that which would significantly enhance the penetration of other substances through the skin.

To this end, the amount of DMSO is about 70% by volume, or less. More preferably, the DMSO concentration is less than about 60%. Even more preferably, the paint stripping compositions of the invention comprise from about 1 to about 50%, or from about 1 to about 40% dimethyl sulfoxide. As shown in the examples below, good to excellent paint stripping effectiveness is maintained in paint stripping compositions at the lower ranges of DMSO concentration.

The components employed in paint stripping compositions of the invention are employed in amounts effective to strip paint from a surface. For the purposes of this invention, the paint stripping compositions are considered effective to strip paint from a surface when contact of the paint stripping composition with a painted surface for an effective period of time enables significant separation or removal of paint from the surface, without substantial damage to the surface. Contact of the paint stripping compositions with the painted surface for an effective period of time is often accompanied by changes or modifications of the paint which include but are not limited to penetration, softening, swelling, flaking, chemically reacting, and/or dissolving the paint. Preferably the period of time effective to change or modify the paint is from about 0.1 to about 1.0 hours. More preferably, the effective period of time is from about 15 minutes to about 30 minutes.

A wide variety of types of paint may be initially disposed on the surface. Typically the paint comprises a thin film of a resin or polymer, and mixtures thereof Typical classes of paints stripped by the compositions and/or methods of the invention include but are not limited to shellacs, varnishes, lacquers, oil based paints, latex enamel paints, and the like. Examples of the resins or polymer components of the paints that may be stripped with the compositions and methods of the invention include but are not limited to lower carboxylic acid esters of cellulose and/or other polysaccharides, polymers and/or copolymers of styrene, olefins, acrylic acid and its esters, methacrylic acid and its esters, vinyl acetate, epoxies or polyurethanes, and mixtures thereof. The film of paint may also comprise conventional paint pigments and additives, including antioxidants, stabilizers, fillers, and the like. Preferably, the film of paint disposed on the surface stripped is less than about 5 mm thick.

The paint stripping compositions are preferably effective to strip paint from the surfaces of metals, ceramics, materials comprising cellulose, and/or mixtures or composites thereof. The paint stripping compositions can strip paint from the surfaces of resins or plastics, but may unacceptably penetrate and/or damage some plastic surfaces, such as polycarbonate surfaces. Preferably, the paint stripping compositions are effective to strip glass, wood, stone, concrete, brick, aluminum, or steel surfaces.

In preferred embodiments of the invention, the proportions of the environmentally acceptable esters and the dimethyl sulfoxide are effective to strip latex enamel paints from a surface. In other preferred embodiments of the invention, the proportions of the environmentally acceptable esters and the dimethyl sulfoxide are effective to strip acrylic, epoxy and/or polyurethane paint from a surface comprising wood, aluminum, concrete, or steel. As disclosed in the examples, a simple procedure may be employed to show that the compositions of the invention are effective to strip a latex enamel paint from a wood surface. In yet other preferred embodiments of the invention, the proportions of the environmentally acceptable esters and the dimethyl sulfoxide are effective to strip acrylic/polyurethane paint from a wood surface.

Preferably, during or after application of the paint stripping composition, the film of paint is substantially removed or otherwise separated from the surface, without objectionable damage to the surface. Typical methods of removing or separating the paint from the surfaces include scraping, brushing, sanding, washing, pressurized sprays of gases, liquids, or abrasive particles, and other similar methods commonly employed by those of skill in the art.

In certain preferred embodiments of the invention, the paint stripping composition comprises from about 60 to about 99% of the one or more environmentally acceptable esters, and from about 1 to about 40% dimethyl sulfoxide. Such compositions have acceptable to good effectiveness for stripping paint, yet are mainly comprised of the environmentally acceptable components of the esters and the DMSO. Beneficial combinations of low skin penetration potential and high paint stripping effectiveness are preferably obtained in paint stripping compositions comprising from about 5 to about 30%, or from about 10 to about 25% dimethyl sulioxide by volume.

One preferred environmentally acceptable ester is t-butyl acetate. t-Butyl acetate is relatively non-toxic, having a LD50 oral rat toxicity of about 4500 mg per kilogram, and provides good paint stripping effectiveness when employed in the paint stripping compositions of the invention. Unlike n-butyl acetate and secondary butyl acetate, t-butyl acetate has been unexpectedly shown to have negligible photochemical reactivity, and has therefore been exempted from regulation as a Volatile Organic Compound ("VOC") air pollutant under 40 CFR Parts 50 and 51,and therefore does not comprise a regulated material for the purposes of those environmental statutes.

Another example of an environmentally acceptable ester is an acetate ester of an alcohol having at least five carbon atoms. The alcohols having at least five carbon atoms may comprise alkyl, alkene, alkylene, aromatic, or heteroaromatic alcohols. More preferably, the alcohols comprise alkyl groups of at least five carbon atoms. Such acetate esters typically have relatively low volatility as compared to esters of lower alcohols, have higher flash points, and present less fire hazard than similar lower esters. Because of their relatively slow rate of evaporation, such esters remain in contact with the paint for relatively long periods without a requirement of thickeners or other agents to slow their evaporation. Examples of such preferred acetate esters are amyl acetate, n-hexyl acetate, 2-ethyl-n-hexyl acetate, and the like. In certain embodiments, the acetate ester of an alcohol having at least five carbon atoms does not comprise an octyl acetate.

Yet another environmentally acceptable ester is a carboxylic acid methyl ester having a carboxylate residue of at least three carbon atoms. Carboxylic acid methyl esters are carboxylic acid esters wherein the $R_b$ residue is methyl. Examples of such esters include but are not limited to methyl butyrate, and methyl propionate. In yet another preferred embodiment, the carboxylic acid ester comprises a carboxylate residue having at least three carbon atoms and an alkoxy residue having at least three carbon atoms, as exemplified by N-butyl butyrate.

Another preferred class of environmentally acceptable esters is monoalkyl ether/acetate esters of alkylene glycols. Examples of preferred members of this class include 2-butoxyethanol acetate, 2-ethoxyethanol acetate, ethylene glycol monomethyl ether acetate, diethylene glycol monobutyl ether acetate, diethylene glycol monoethyl ether acetate, diethylene glycol monomethyl ether acetate, or 2-methoxy-1-methylethyl acetate.

In one embodiment, preferred species of environmentally acceptable acetate esters which may be employed in the invention comprise amyl acetate, 2-butoxyethanol acetate, 2-ethoxyethanol acetate, ethylene glycol monomethyl ether acetate, n-hexyl acetate, diethylene glycol monobutyl ether acetate, diethylene glycol monoethyl ether acetate, diethylene glycol monomethyl ether acetate, or 2-methoxy-1-methylethyl acetate.

Yet another preferred class of environmentally acceptable esters are esters of lactic acid. Preferably, the lactic acid esters comprise alkoxy residues having alkyl, lower alkyl, or alkylidene residues. Examples of such esters are methyl lactate, ethyl lactate, n-propyl lactate, i-propyl lactate, n-butyl lactate, i-butyl lactate, t-butyl lactate, amyl lactate, and 2-ethyl-hexyl lactate. The lactic acid esters may also preferably comprise esters of the 2-hydroxyl group lactic acid, such as the methyl ester of lactic acid dimer, or the dimeric cyclic diester of lactic acid, as shown below.

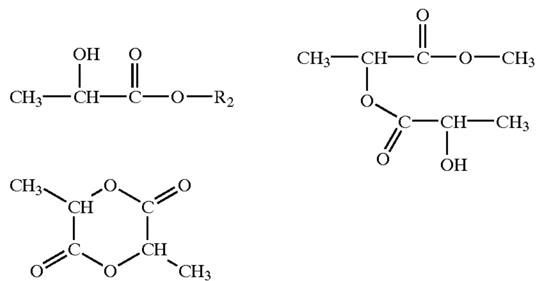

Another preferred class of environmentally acceptable esters are esters of oxalic acid having two alkoxy residues, shown as independently selected $R_2$ and $R_2'$ residues below. Because dimethyl and diethyl oxalate are unacceptably toxic, each alkoxy residue of the ester of oxalic acid preferably has at least three carbon atoms. Examples of such compounds include but are not limited to ethanedioic acid-dipentyl ester and dibutyl oxalate.

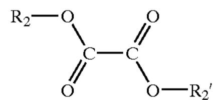

In another embodiment, preferred species of environmentally acceptable esters are ethylene carbonate, propylene carbonate, diethyl carbonate, diethyl tartrate, triethyl citrate, tributyl citrate, n-butyl acetate, isopropyl acetate, n-propyl acetate, ethyl acetate, methyl acetate, dipropylene glycol monomethyl ether acetate, and the composition does not contain an alcohol solvent.

The paint stripping compositions can further comprise dimethyl sulfone. In these embodiments, the dimethyl sulfone is preferably present at up to about 35% of the paint stripping composition by volume. Preferably, dimethyl sulfone may comprise from about 1 to about 25% of the paint stripping composition by volume. More preferably, dimethyl sulfone may comprise from about 1 to about 20%, from about 2 to about 15%, or from about 5 to about 13% of the paint stripping composition by volume.

In many preferred embodiments, the paint stripping composition further comprises at least one additive. Chlorine-free co-solvents comprise any organic liquid composition not containing covalently bound chlorine atoms. Chlorine-free co-solvents preferably lower the cost of the composition, while preferably maintaining the paint stripping effectiveness and environmental acceptability of the paint stripping composition. Activators are small, very polar compounds, which help break the adhesive forces between a paint film and a substrate. Examples of activators include acidic and basic compounds. Fire-proofing agents denote compounds or mixtures of compounds that when added into a formulation serve to inhibit, slow, or hinder the ignition or spread of fire. Examples of fire proofing agents include organic phosphate compounds or poly-brominated aromatic compounds. Thickeners are compounds that can be employed to increase the viscosity of the paint stripping compositions and/or formulations, so as to slow evaporation of volatile solvents, and improve retention of the composition on the paint surface. Examples of suitable thickeners include soluble polymers such as carboxymethyl- or hydroxypropyl-cellulose. Stabilizers are additives, which prolong the shelf life of the paint stripping compositions. Examples of suitable stabilizers include anti-microbials, antioxidants, and UV stabilizers. Surfactants are anionic, cationic, or non-ionic compounds, which serve to reduce interfacial surface tension of immiscible liquids. Preferred non-ionic surfactants are ethoxylated fatty or aromatic alcohols. Evaporation inhibitors are oils or waxes, inhibit the evaporation of the volatile components of the formulation.

One class of suitable additives is sugar esters. Sugar esters are carboxylic acid esters wherein the alkoxy residue of the ester is derived from a sugar, i.e., a lower saccharide. Lower saccharides include monosaccharides, disaccharides, trisaccharides, and the like, up to oligosaccharides having up to about eight saccharide residues. Preferably the individual saccharide residues comprise naturally occurring sugar residues such as glucose, fructose, mannose, galactose, and the like, each of which has several esterifiable hydroxyl groups. The one or more carboxylate residues of the sugar esters may independently comprise any carboxylate residue having up to about 24 carbon atoms, including fatty acid residues having up to about 18 carbon atoms. In some embodiments, the carboxylate residues preferably comprise from about 1 to about 4 carbon atoms, including acetate, propionate, and butyrate residues. As is well known, saccharides contain multiple hydroxyl groups, which are available for esterification, so that the lower saccharide sugars may have multiple carboxylate residues. Sugar esters preferably serve as non-toxic and biodegradable thickeners for the paint stripping compositions.

In these preferred embodiments, the sugar ester is a mono-, di- or tri-ester of sucrose having from about one to about three $C_1$–$C_{18}$ aliphatic carboxylate residues. As is well known, sucrose is a readily available disaccharide having eight esterifiable hydroxyl groups. The one to three carboxylate residues may be bonded to any combination of the eight esterifiable hydroxyl oxygen atoms. In even more preferred embodiments, the mono-, di-, or tri-ester of sucrose has at least one alkyl ether residue. The alkyl ether residue is bonded to one of the unesterified hydroxyl oxygen atoms of the sucrose ester. In a highly preferred embodiment, the sugar ester is a sucrose acetate isobutyrate, which comprises a sucrose residue, having at least one acetate residue, and at least one isobutyrate residue bonded to one of the eight esterifiable hydroxyl oxygen atoms. Sucrose acetate isobutyrate is not toxic, and is biodegradable.

The paint stripping compositions can further include an aromatic hydrocarbon diluent composition. The aromatic diluent compositions comprise non-halogenated aromatic hydrocarbon compounds having from about seven to about 15 carbon atoms, which include but are not limited to toluene, ethyl benzene, xylenes, cumene, trimethylbenzenes, and the like. Addition of such aromatic diluent compositions lowers the cost of the paint stripping compositions of the invention, while maintaining paint stripping effectiveness. Preferably, the aromatic diluent compositions comprise a liquid mixture principally comprising non-halogenated aromatic hydrocarbon compounds, which are inexpensively produced in oil refining processes, and are marketed as mixtures having similar ranges of volatility and/or flash point. For example, Exxon/Mobil Corporation supplies an aromatic diluent composition under the trade name Aromatic 100™, which is comprised of a mixture of predominantly aromatic $C_8$–$C_{10}$ hydrocarbons including xylene and 1,2,4-trimethylbenzene, which has a flash point of approximately 42° C. (about 107° F.). Some saturated hydrocarbons of similar volatility may be present. A similar Aromatic 150™ composition comprises predominantly $C_8$–$C_{10}$ hydrocarbons including napthalene and 1,2,4-trimethylbenzene, which has a flash point of approximately 63° C. (about 145° F.), and an Aromatic 200™ composition which comprises predominantly $C_9$–$C_{15}$ hydrocarbons including napthalene which has a flash point of approximately 95° C. (about 203° F.). Preferred aromatic diluent compositions are substantially depleted of naphthalene and 1,2,4-trimethylbenzene, so that the materials are not listed under the code of federal regulations (40 CFR) and the provisions of section 313 of Title III of the Superfund Amendments and Reauthorization Act (SARA) as "hazardous waste." Spills of such materials, exemplified by Aromatic 150 ND™, are not reportable under SARA as "hazardous waste." Similar mixtures of aromatic hydrocarbons are readily available from many sources, and are suitable non-chlorinated co-solvent additives of the present invention.

Another aspect of the present invention relates to a method for stripping paint from surfaces, comprising:

a) contacting a painted surface with a paint stripping composition, and b) separating at least some of the paint contacted with the paint stripping composition from the painted surface; wherein the paint stripping composition comprises:

i) one or more environmentally acceptable esters, and ii) dimethyl sulfoxide.

The paints, the surfaces, and the paint stripping compositions related to the method of the invention have been previously described hereinabove. Preferably, the paint comprises an acrylic, epoxy, or polyurethane polymer, or a mixture thereof. Preferably, the paint stripping composition contacted with the painted surface comprises from about 70 to about 99% of the one or more environmentally acceptable esters, and from about 1 to about 30% dimethyl sulfoxide. Preferably, the painted surface is wood, aluminum, concrete or steel.

Preferably, the painted surface is contacted with an amount of paint sufficient to substantially cover the painted surface with the paint stripping composition. Preferably, the painted surface is contacted with the painted surface for a time sufficient to affect or modify the paint so that the paint may be separated or removed from the surface.

Experimental

The following examples are put forth so as to provide those of ordinary skill in the art with a complete disclosure and description of how the compositions, and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) But some errors and deviations should be accounted for. Unless indicated otherwise, parts are parts by weight, temperature is in ° C. or is at ambient temperature, and pressure is at or near atmospheric.

EXAMPLE 1.

Three coats of acrylic-polyurethane latex enamel paint (Devoe Semi-Gloss Interior Latex Enamel Paint) were applied to a #2 yellow pine wood substrate, each coat having a color (gray, white, or red) which is easily distinguished from the other two. The paint was allowed to cure (cross-link) at 120° C. for 24 hours, and for at least about 21 days at ambient temperature before paint stripping experiments were performed. For each tested stripping composition, 1.0 gram of paint stripping composition was applied evenly over a testing area of the painted and cured wood measuring 1"×2", at ambient temperature (approximately 25° C.).

After a contact time of 20 minutes, the paint coatings were removed manually using a square-tipped scraping spatula. Paint stripping performance was visually evaluated based on the ability of the composition to remove the successive layers of paint from the wood substrate. Thus, the most effective stripping compositions could remove all three paint coatings, and were thus given a rating of"3". A less effective paint stripping formulation removed only two of the three paint coatings, and was designated a rating of "2". The least active paint strippers removed only one or none of the paint layers, and were rated "1" or "0" respectively. The results obtained are shown below:

| Ester | 100% ester | 100% DMSO | 70% ester + 30% DMSO |
|---|---|---|---|
| t-butyl acetate | 2 | 2 | 3 |
| ethyl lactate | 2 | 2 | 3 |
| n-butyl acetate | 1–2 | 2 | 3 |

When either the esters or DMSO were employed alone, only one or two layers of the paint were removed by the scraping action. When the esters were combined with dimethyl sulfoxide, considerable softening of the paint surface was evident, and all three layers of paint were removed by the combination paint stripper which contained only environmentally acceptable components.

EXAMPLE 2

Using the procedure of Example 1, 5 paint stripper compositions were compared to the effectiveness of a commercially available methylene chloride-based paint stripper "Liquid Kutzit™" supplied by Savogran, of Norwood, Mass. Composition A was neat DMSO, Composition B was neat ethyl lactate, Composition C was 25% ethyl lactate, 75% DMSO (by volume), Composition D was 50% ethyl lactate, 50% DMSO, and Composition E was 75% ethyl lactate, 25% DMSO. Tests of paint stripping effectiveness were conducted. During the paint stripping effectiveness testing, paint stripping speed was also qualitatively tested, by scratching a corner of a region of the paint contacted with the strippers with a spatula at 5–10 minute intervals, in order to detect softening of the paint. Based on the results of the paint stripping effectiveness and speed tests, the paint stripping compositions were rank ordered.

For paint stripping effectiveness, the compositions were rated (from best to worst):

Liquid Kutzit™ $\geqq$E>D>A$\cong$C>B.

For paint stripping speed, the compositions were rated (from best to worst):

Liquid Kutzit™ >E>D=A>C>B.

Throughout this application, various publications are referenced. The disclosures of these publications are hereby incorporated by reference in their entireties into this application for all purposes.

It will be apparent to those skilled in the art that various modifications, substitutions, omissions, variations, and other changes can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for stripping paint from surfaces, comprising:

a) contacting a painted surface with a paint stripping composition, and b) separating at least some of the paint contacted with the paint stripping composition from the painted surface;

c) wherein the paint stripping composition comprises:

i) from about 60 to about 99% by volume of one or more environmentally acceptable esters selected from the group consisting of t-butyl acetate, a carboxylic acid methyl ester having a carboxylate residue of at least three carbon atoms, an ester comprising a carboxylate residue having at least three carbon atoms and an alkoxy residue having at least three carbon atoms, an ester of lactic acid, an ester of oxalic acid having two alkoxy residues wherein each alkoxy residue has at least three carbon atoms, diethyl tartrate, triethyl citrate, tributyl citrate, and one or more sugar esters; and ii) dimethyl sulfoxide which is present in an amount from about 1 to about 40% by volume of the composition.

2. The method of claim 1, wherein the paint stripping composition comprises from about 70 to about 99% of the one or more environmentally acceptable esters, and from about 1 to about 30% dimethyl sulfoxide.

3. The method of claim 1, wherein the paint comprises an acrylic, epoxy, or polyurethane polymer, or a mixture thereof.

4. The method of claim 1, wherein the surface is wood, aluminum, concrete or steel.

5. The method of claim 1, wherein the one or more environmentally acceptable esters do not comprise lower alkyl diesters of aliphatic diacid residues derived from succinic, adipic, or glutaric acids.

6. The method of claim 1, wherein the surface is a metal, a ceramic, a material comprising cellulose, a mixture thereof, or a composite thereof.

7. The method of claim 1, wherein the environmentally acceptable ester has an $LD_{50}$ toxicity in rats of at least 1900 milligrams per kilogram.

8. The method of claim 1, wherein the paint stripping composition is effective to strip acrylic, epoxy or polyurethane paint from a surface comprising wood, aluminum, concrete, or steel.

9. The method of claim 1, wherein the one or more environmentally acceptable esters comprise t-butyl acetate.

10. The method of claim 1, wherein the one or more environmentally acceptable esters comprise a carboxylic acid methyl ester having a carboxylate residue of at least three carbon atoms.

11. The method of claim 1, wherein the one or more environmentally acceptable esters comprise an ester of lactic acid.

12. The method of claim 1, wherein the one or more environmentally acceptable esters comprise an ester of oxalic acid having two alkoxy residues, wherein each alkoxy residue has at least three carbon atoms.

13. The method of claim 1, wherein the one or more environmentally acceptable esters comprise a carboxylate residue having at least three carbon atoms and an alkoxy residue having at least three carbon atoms.

14. The method of claim 1, wherein the one or more environmentally acceptable esters comprise diethyl tartrate, triethyl citrate, or tributyl citrate, and the composition does not contain an alcohol solvent.

15. The method of claim 1, wherein the environmentally one or more environmentally acceptable esters have a flash point greater than about 32° F.

16. The method of claim 1, wherein the paint stripping composition comprises dimethyl sulfone.

17. The method of claim 1, wherein the paint stripping composition comprises one or more sugar esters.

18. The method of claim 17, wherein the one or more sugar esters are a mono-, di- or tri-ester of sucrose having one to three $C_1$–$C_{18}$ aliphatic carboxylate residues.

19. The method of claim 18, wherein the mono-, di-, or tri-ester of sucrose has at least one alkyl ether residue.

20. The method of claim 17, wherein the sugar ester is a sucrose acetate isobutyrate.

21. The method of claim 1 wherein the one or more environmentally acceptable esters comprise from about 70 to about 95% of the paint stripping composition by volume.

22. The method of claim 1 wherein the paint stripping composition comprises dimethylsulfoxide at from about 5 to about 30% by volume.

23. The method of claim 1, wherein the one or more environmentally acceptable esters consist essentially of t-butyl acetate.

* * * * *